United States Patent [19]
Bailey

[11] Patent Number: 5,349,663
[45] Date of Patent: Sep. 20, 1994

[54] SYSTEM FOR REPRESENTING HIERARCHICAL STRUCTURES

[76] Inventor: Ronn H. Bailey, P.O. Box 791, Orange, Calif. 92666

[21] Appl. No.: 907,515

[22] Filed: Jul. 1, 1992

[51] Int. Cl.⁵ .............................................. G06F 12/00
[52] U.S. Cl. .............................. 395/700; 364/DIG. 1; 364/286.4; 364/286.5
[58] Field of Search ................ 395/700; 364/286.4, 364/286.5

[56] References Cited

U.S. PATENT DOCUMENTS 4,318,184  3/1982  Millett et al. ................. 364/900
4,761,746  8/1988  Tano et al. .................... 364/513

Primary Examiner—Kevin A. Kriess
Assistant Examiner—A. Katbab

[57] ABSTRACT

A system and method is provided which represents hierarchical relationships. These relationships are statically stored in a compact manner that allows for easy determination of relations (such as dominance) between any two entities defined to the hierarchy. This stored information is referred to a dominance key or a DOMKEY. DOMKEYs, rather than storing the actual relationship between entities defined to the hierarchical structure, store a representation of the structure itself. In a preferred embodiment, the present invention is applied to computer security systems such as the RACF system and is embedded in a RACF administrator such as Vanguard Integrity Professionals VRA RACF Administrator.

19 Claims, 4 Drawing Sheets

| LEVEL | GROUP | (OWNER) | USERS WITH GREATER THAN "USE" AUTHORITY |
|---|---|---|---|
| 01 | SYS1 | (IBMUSER) | IBMUSER JOIN |
| 02 | VSANSET | (IBMUSER) | IBMUSER JOIN |
| 02 | SYSCTLG | (IBMUSER) | IBMUSER JOIN |
| 02 | GROUP1 | | |
| 03 | GROUP2 | | |
| 02 | GROUP2 | | |
| 03 | TSTCRP1 | (USERIDA) | |
| 03 | TSTCRP2 | (USERIDA) | |
| 03 | TSTCRP3 | (USERIDA) | |
| 03 | SURROGAT | (USERIDB) | |
| 02 | RESGRPS | | |
| 03 | CICSTRNS | | |
| 03 | DASDVOLS | | |
| 03 | TERMIALS | | |
| 02 | DATAGRPS | | |
| 03 | HLQ100 | | USERIDC OPERATIONS CREATE<br>USERIDD OPERATIONS CREATE<br>USERIDE OPERATIONS CREATE<br>USERIDB OPERATIONS CREATE |
| 04 | HLQ110 | | USERIDC CREATE<br>USERIDD CREATE<br>USERIDE CREATE<br>USERIDB CREATE<br>USERID1 SPECIAL AUDITOR ADSP |
| 05 | HLQ111 | | USERIDC CREATE |

FIG. 5a

| LEVEL | GROUP (OWNER) | USERS WITH GREATER THAN "USE" AUTHORITY |
|---|---|---|
| | | USERIDD CREATE<br>USERIDE CREATE<br>USERIDB CREATE |
| 03 | HLQ200 | |
| | | USERIDC OPERATIONS CREATE<br>USERIDD OPERATIONS CREATE<br>USERIDE OPERATIONS CREATE<br>USERIDB OPERATIONS CREATE |
| 04 | HLQ220 | |
| | | USERIDC CREATE<br>USERIDD CREATE<br>USERIDE CREATE<br>USERIDB CREATE |
| 05 | HLQ222 | |
| | | USERIDC CREATE<br>USERIDD CREATE<br>USERIDE CREATE<br>USERIDB CREATE |
| 03 | HLQ300 | |
| | | USERIDC OPERATIONS CREATE<br>USERIDD OPERATIONS CREATE<br>USERIDE OPERATIONS CREATE<br>USERIDB OPERATIONS CREATE |
| 04 | HLQ330 | |
| | | USERIDC CREATE<br>USERIDD CREATE<br>USERIDE CREATE<br>USERIDB CREATE |
| 05 | HLQ333 | |
| | | USERIDC CREATE<br>USERIDD CREATE<br>USERIDE CREATE<br>USERIDB CREATE |
| 03 | HLQ400 | |
| | | USERIDC OPERATIONS CREATE<br>USERIDD OPERATIONS CREATE<br>USERIDE OPERATIONS CREATE<br>USERIDB OPERATIONS CREATE |

FIG. 5b

SYSTEM FOR REPRESENTING HIERARCHICAL STRUCTURES

BACKGROUND OF THE INVENTION

1. Technical Field

The present invention relates to hierarchical systems, and more particularly to a system for representing and determining relationships between entities in a hierarchy.

2. Discussion

Systems and organizations are frequently hierarchical in their structure. Computer systems designed to interact with such systems and organizations must reflect their internal hierarchy. For example, access to a computer system could reflect the hierarchy of the organization to ensure not only that persons have sufficient access and system capability to perform their required job functions, but also to restrict their ability to access and control areas of the system outside their job functions. As a result, individuals at high levels in the corporate hierarchy would be able to access and control broad areas in the computer system commensurate with their job responsibilities; while lower level employees would have a restricted ability to access and control. Further, it is desirable to restrict even higher level employees' ability to interact with areas outside of their responsibilities. For example, individuals in the manufacturing branch of a hierarchy should not ordinarily have access to payroll and vice versa.

To meet these objectives, a number of computer security systems have been developed. Such security systems may be integrated as part of an operating system or may comprise an additional piece of software used as an adjunct to an existing operating system. Examples of the former include the network operating system called Netware, sold by Novell, Inc. of Provo, Utah; and examples of the latter include RACF, sold by IBM Corporation, CA-TOP Secret and CA—ACF-2, both sold by Computer Associates, Rosemont, Ill. These kinds of security systems, in general, can be used to define each individuals' position in a hierarchical organization and define his access and control to a limited sphere within the hierarchy.

Unfortunately, existing security systems have a number of limitations. Generally, determining relations between entities in a hierarchy in computer security systems is accomplished by dynamically accessing the entity definitions to determine their relative positions within the hierarchy. This causes a traversal of the hierarchical structure each time the relation between entities is required.

The dynamic method of determining hierarchical relations is costly in terms of processing time and resources. This is due to the method used to determine it, which involves retrievals of multiple entities defined to the hierarchical system each time their relation needs to be determined. (In effect, a traversal of the structure) Also, since entity definitions are local to the system where they are defined, this dynamic method does not provide the ability to decentralize or remotely determine a relation. As a result, it is not possible to administer the security product without duplicating the security definitions at a remote site. Further, it is not possible to administer the security product without having the security product installed.

In addition, with the dynamic approach, relationships are determined at the time an operation is being performed and it is not possible (or is very difficult) to generate reports detailing either the operations a particular entity can perform or that entity's scope of authority. Also, the overhead in a dynamic system is high because it requires the retrieval of the entity definitions throughout the hierarchy each time the relationship is determined.

Alternatively, a static method might be used to store the relationships between entities. However, this method would probably require maintaining tables or lists that contain the relationship of each defined entity to all other entities. Unfortunately, the amount of information stored would be large due to the number of permutations possible between even a small number of defined entities. While this method might allow for easy determination of the individual relationships, it does not allow for a concise representation of the structure itself.

Thus, it would be desirable to provide a simple method of determining the relationship between entities in a hierarchy. It would also be desirable to provide such a method which can determine the hierarchical relations without involving the security product each time the relation is required. It would also be desirable to provide a system which permits decentralization to allow determination of hierarchical relations at a remote site without requiring access to the security product. It would also be desirable to provide a mechanism for determining such relations to make possible an easy method of providing reports detailing the operations a particular entity is able to perform and the scope of an entity's authorities. Further, it would be desirable to provide a system with the above features which operates quickly and uses a minimal amount of computing resources and without invoking the security product each time hierarchical relations are needed.

SUMMARY OF THE INVENTION

Pursuant to the present invention, a system and method is provided which represents hierarchical relationships. These relationships are statically stored in a compact manner that allows for easy determination of the dominance between any two entities defined to the hierarchy. This stored information is referred to as a dominance key or DOMKEY. Hierarchical systems have a definite structure. For any two entities defined to a system, there is a relationship between them. Due to the hierarchy of the system, one of the entities will be superior or dominant in relation to the other. The relation which determines which entity is in the dominant hierarchical position, can be referred to as the dominance relation. DOMKEYs, rather than storing the actual relationship between entities defined to the hierarchical structure, store a representation of the structure itself.

In accordance with a first aspect of the present invention, a method for determining hierarchical relationships between entities comprises the steps of first defining a DOMKEY for each position in the hierarchy. Each DOMKEY is a unique string of information. The DOMKEYs of higher positions in the hierarchy are incorporated in their entirety into the DOMKEYs of positions below them in the hierarchy. Next, each entity in the hierarchy is assigned one of the DOMKEYs which corresponds to the position of that entity in the hierarchy. Next, a determination is made to see if the DOMKEY for a first entity matches for its full length with that of the DOMKEY for a second entity. If this determination results in a match, it is confirmed that the second entity is at a position below the first entity in the hierarchy, when the second entity has a DOMKEY which is longer than that of the first entity.

In accordance with a second aspect of the present invention, a system is provided for defining relationships between entities in a hierarchy. The system includes a means for defining a DOMKEY for each position in the hierarchy, wherein each DOMKEY is a unique string of information, and wherein the DOMKEYs of higher positions in the hierarchy are incorporated in their entirety into the DOMKEYs of position below them in the hierarchy. The system also includes a means for assigning to each entity in the hierarchy, one of the DOMKEYs corresponding to the position of the entity in the hierarchy. Also, the system includes a means for determining if the DOMKEY for a first entity matches for its full length with that of the DOMKEY for a second entity. If this determination results in a match, then it is confirmed that the second entity is at a position below the first entity in the hierarchy, if the second entity has a DOMKEY that is longer than that of the first entity.

Thus, in accordance with the teachings of the present invention, the amount of information required to be stored to statically determine the relationship between entities is greatly reduced. DOMKEYs store the structure representation in a manner that allows for a very simple process to determine the relationship between entities. Since the DOMKEY is an actual representation of the hierarchical structure, it can be used not only for easily determining the relationship between entities but also facilitating the production of reports or displays of the hierarchical structures.

BRIEF DESCRIPTION OF THE DRAWINGS

The various advantages of the present invention will become apparent to one skilled in the art by reading the following specification and by reference to the following drawings in which:

FIG. 5a–5b depicts an example of a report generated in accordance with the present invention displaying a hierarchical structure.

DESCRIPTION OF THE PREFERRED EMBODIMENTS

Figure 1:
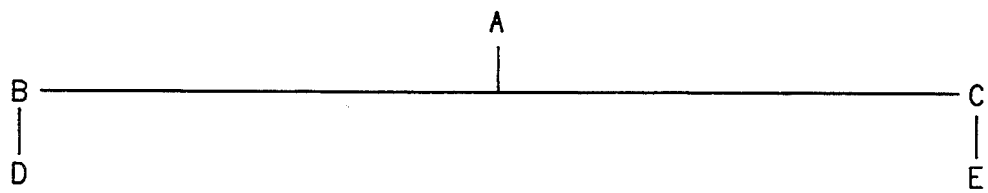
FIG. 1 is a simple hierarchical structure having five elements.

The present invention is a system and method for representing hierarchical relationships. It will be appreciated that these teachings may be applied to any system that uses a hierarchical structure for defining relations between defined entities. In accordance with a preferred embodiment, the present invention is used to define relationships between entities defined to computer security systems. In one preferred embodiment, these techniques are applied to the hierarchical group's structure in the determination of authorities available within a groups scope of control as implemented with the Resource Access Control Facility (RACF) Security System sold by International Business Machines Corporation (IBM ®).

The present invention provides a technique for determining which of two entities is in a dominant hierarchical position (also referred to as the dominance relation). The dominance relation is represented by a dominance key or DOMKEY. DOMKEYs are strings of information assigned to all entities defined to the hierarchical structure being modeled. If entities defined within the hierarchy can control entities defined to the system outside the hierarchy, then those entities outside the structure may also have DOMKEYs assigned to them. Assigning DOMKEYs to the entities outside the structure allows determination of any internal hierarchical entity's ability to control the outside entity.

To determine the dominance relation or dominance between entities, the entities for which the relation is required have their DOMKEYs compared. If the DOMKEY of the first entity matches for its full length with that of the DOMKEY of the second entity (and the second entity DOMKEY is longer), then the first entity dominates the second entity.

With regard to security systems that implement hierarchical controls, in general, there are two classes of entities defined: SUBJECTs, which represent the identity of the users or programs interfacing with the system, and OBJECTs which represent the resources that the system maintains control over. Security systems use these hierarchical definitions of SUBJECTs and OBJECTs to implement a set of rules, possibly among others, that determine if the SUBJECT is allowed access to an OBJECT. There are instances when a SUBJECT may be considered an OBJECT. This would occur when a SUBJECT is attempting to access (possibly for the purpose of altering an existing definition or creating a new definition) another SUBJECT defined to the system. DOMKEYs simplify the determination of these rules.

In accordance with a preferred embodiment of the present invention, DOMKEYs are applied to the RACF System. RACF implements a hierarchy within the definition of groups to the security system. In RACF, groups in general, have two functions; 1) As a method of grouping users into single administrative entities, and 2) as a SUBJECT entity without users being connected to them. RACF groups are defined in a hierarchical structure. The groups can be defined such that they either allow access control capabilities to flow down the hierarchy, or they cause the access control capabilities to stop, thus breaking the hierarchy. Users can be connected to groups in a way that they have access/control capabilities to all the resources controlled by the groups within the specific group hierarchy.

Within RACF, this hierarchy is established by the RACF concept of ownership. RACF establishes a referential relationship for ownership among the entities that can be defined to it. Dataset and general resource entities (OBJECTs) must be owned by either RACF group or user entities (SUBJECTs). Likewise, groups must also be owned by either another group or user entity, and users must be owned by another user or group entity. The ability to affect the definition of an entity or to alter the ability to access an entity is (at least partially) controlled by this ownership relation. If a group is owned by its superior group then the control abilities flow down the hierarchy. If the group is owned by a user the hierarchy breaks and the control abilities do not flow. If the SUBJECT (within the group structure dominates the OBJECT, then alteration of the OBJECT is allowed.

DOMKEYs are assigned to all entities defined within the hierarchical system. This allows DOMKEYs to be used to determine the relationship between any two entities in the structure. This relationship may be disjointed (i.e. the entities do not relate to each other). If you view the hierarchy as a tree, this would occur if the entities were defined on two separate branches that were each attached to the same trunk.

When dealing with these systems, often the entities defined to the hierarchy have control over other entities in the system that are not part of the hierarchy itself. If this is the case, it is necessary to assign DOMKEYs to the entities that are defined outside of the hierarchical structure as well as those defined within it in order to have the ability to determine if the entities in the hierarchy have control over those outside the hierarchy.

The process of establishing the Dominance Relation is a non-numerical left to right positional compare. The Dominance Relation is a binary (yes/no) one and thus the actual value of a DOMKEY has no relevance in terms of higher or lower orders of Dominance. Because of this, DOMKEYs can be represented in any number of ways. For example, they can be character data such as numbers or letters, or a string of binary bits. It should be noted that each position within the DOMKEY must be capable of representing the maximum number of entities that can be defined to any level of the hierarchical structure. Thus, in a practical application of DOMKEYs, each logical position may in fact be multiple physical positions. To avoid confusion, each logical position within a DOMKEY will be referred to as a cluster.

For purposes of this description, DOMKEYs will be composed of a string of numbers. Each cluster within the DOMKEY will be represented by a single numerical digit. In general, each entity is given a unique DOMKEY then the next entity lower in the hierarchy has the DOMKEY of its superior prefixed to its own DOMKEY. At points in the structure where the hierarchy breaks, the DOMKEY of the superior entity is not prefixed to the DOMKEY of the subordinate entity.

For example, consider the hierarchy shown in FIG. 1. The hierarchical relationship propagates as follows: If A dominates B and B is defined such that the dominance of B by A allows A to dominate D then A's DOMKEY would be prefixed to B's unique DOMKEY when B's DOMKEY is constructed. B's DOMKEY (including the prefix) would be prefixed to D's DOMKEY. Also, if A dominates C and due to its definition, C prevents A from dominated E, then the hierarchy breaks at E and while C's unique DOMKEY would be prefixed by A's DOMKEY, the unique DOMKEY constructed for E would not be prefixed at all.

In order to construct DOMKEYs, it is necessary to determine the hierarchical structure of the particular system. This is because the system hierarchy determines the processing order used in constructing and assigning the DOMKEYs.

DOMKEYs must be constructed in a top down manner. That is, the first entities to have DOMKEYs constructed are those highest in the hierarchy and the processing continues down the hierarchy to the entities lowest in the hierarchy. If the system also has the capability of assigning a system-wide or global form of authority allowing dominance over all defined entities, the DOMKEY creation process must allow for it, however it does not have applicability to the processing order.

For example, in RACF there is a hierarchy of the entity definitions with regard to scope of control of groups in the group structure. In view of the above discussion, it can be seen that since all OBJECTs (datasets and general resources) defined to RACF must be owned by either a user or a group, OBJECTs are lowest in the hierarchy. Also in RACF, users cannot exist without belonging to a group, establishing that groups are above users in the hierarchy. RACF also has the ability to assign users both global authorities and/or authorities within a group's hierarchical scope. These authorities must be allowed for but do not affect the processing order for establishing the DOMKEYs. With this in mind, the hierarchy of entities defined to RACF (with regard to a groups's scope of control) is:

Groups

Users

OBJECTs (datasets and general resources)

To actually assign DOMKEYs to the entities defined to the hierarchy, a starting value (that can be incremented) must first be chosen. In the present example, we will choose the number one (1). The entity defined at the highest level of this hierarchy is assigned this starting value and the starting value is incremented.

For each level of the hierarchy beneath the highest level, the entities defined at that level are assigned an incremental value from 1 to n where n is the number of entities defined to the level. This provides a unique value for each entity defined to the same level of the hierarchy.

Now, starting with the level immediately below the highest level, each entity has the DOMKEY value of its superior prefixed to its own DOMKEY. This is repeated for each level, sequentially proceeding down the hierarchy from higher to lower levels until all levels have been processed.

If there is more than one hierarchy defined to the system, the process is repeated for each such hierarchy, assigning the current starting value to the highest defined entity and then incrementing the starting value. Thus the first hierarchy processed has a highest entity with a DOMKEY of one, the second hierarchy has a highest entity with a DOMKEY of two, etc.

If an entity defined to the system can have attributes assigned that allow it to act as if it were at a specific point of the hierarchical structure, then that entity is given the DOMKEY of the entity defined to the structure at that point.

If the system is one that allows for global attributes to be assigned that allow dominance over all other entities, then all of the DOMKEYs are prefixed with a "system" cluster. Since the actual value used to represent "system" authority does not matter, we will use a value of zero (0) for this new first cluster. The only requirement with regard to this first cluster, is that it be initialized to the same value across all DOMKEYs, and that the value used to initialize it is the one assigned as a DOMKEY to the entities that have the global attribute assigned. At this point, all entities that have global attributes assigned are assigned this value for their DOMKEY.

At this point, all entities that can dominate should have a DOMKEY assigned, and it is now necessary to assign DOMKEYs to entities that can be dominated. Once the entities defined to the hierarchy have had DOMKEYs defined, it is a simple matter to assign DOMKEYs to the entities controlled (dominated) by the entities in the hierarchy. Controlled entities may be, but do not have to be, also defined to the hierarchy. That is, they may be entities defined to the system outside the hierarchical structure itself. Each such controlled entity receives the DOMKEY of the hierarchical entity that controls it. This occurs as long as the entity is controlled by an entity defined in the hierarchy. If it is not controlled by an entity in the hierarchy, then it receives a null DOMKEY unless the system allows for global attributes. If this is the case, then the entity is given a DOMKEY that has the same value as the DOMKEYs given to the entities with that global attribute.

As implied from the above discussion, a particular entity may have more than one DOMKEY assigned. All entities defined to the hierarchy and all entities that can have attributes assigned to them giving them authorities as if they were part of the hierarchy are guaranteed to have DOMKEYS assigned to them. Since these are the DOMKEYs that will be used when the entity acts as a SUBJECT, they will be referred to as SUBJECT DOMKEYs or SDKS. Any entity that did not get an SDK assigned by the above process, would have a null SDK assigned. All entities that can be controlled also have a DOMKEY assigned, and these will be referred to as OBJECT DOMKEYs or ODKS. The DOMKEYs assigned to these controlled entities would be the same as the SDK of the entity which controls them. When an entity can both control and be controlled, that is, act as both a SUBJECT and an OBJECT, it will have both a SDK and an ODK.

If an entity has been granted a global or system attribute, a DOMKEY will be assigned to it for each such attribute. Since these DOMKEYs are based on attributes, they will be referred to as ATTRIBUTE DOMKEYs or ADKs. It may be necessary to further qualify the ADKs if the nature of the authorities granted by the system attribute vary according to the system attribute. When determining the Dominance Relation either the SDK, or the ADK of entity 1 would be compared to the ODK of entity 2 to see if entity 1 dominates entity 2.

With regard to SUBJECTs in RACF, this means that groups would have an SDK assigned. Further, any user which has been assigned attributes at a group level would get an ADK (with the same value as the SDK that was assigned to the group). Any users that have system or global attributes would also be assigned an ADK. All other SUBJECTs would be assigned a null SDK.

For RACF OBJECTs, they would each be assigned an ODK equal to the SDK or ADK of the subject that owns them. If the OBJECT is owned by a SUBJECT with a null SDK then it is assigned a null ODK. If there are global attribute capabilities in the system, and they are being accounted for via DOMKEYs, then rather than a null ODK, the OBJECTs owned by the SUBJECTs with null SDKs would be assigned an ODK with the value of the "system" ADK.

The following examples will give details of assigning DOMKEYs in a RACF security system for the purposes of being able to determine ability of a SUBJECT to access an OBJECT using either global system type authorities, or group authorities.

Assignment of DOMKEYS to RACF Groups

In RACF, groups are organized into a hierarchical tree structure, with each group having a superior group and zero (0) or more subgroups. As long as a subgroup is owned by its superior group, the Dominance Relation propagates from the superior group to the subgroups. Thus, if a subgroup is not owned by its superior group, the hierarchy stops.

All group SDKs are prefixed with a global or system wide SDK value of zero (0). This is because the group SDKs are related to group level attributes and therefore are always dominated by system level attributes, such as system wide SPECIAL, OPERATIONS and AUDITOR.

For groups, SDK assignment is driven by ownership and positional order of subgroups. As long as subgroups are owned by their superior group, they are given an SDK with an incremental value based on their position within their hierarchical level and then the groups SDK is prefixed with the SDK of the superior group.

When a group is owned by a userid, its SDK is not prefixed with the SDK of its superior group, but rather it is assigned the next value at the base level. This begins the existence of a new hierarchy.

Figure 2:
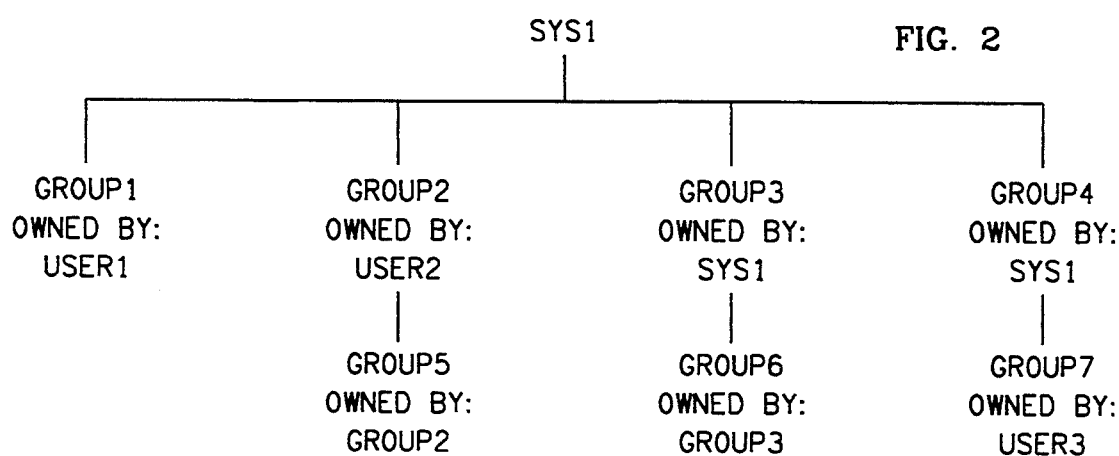
FIG. 2 is a hierarchical structure employing a plurality of groups and users.

For the purposes of the following example shown in FIG. 2, a group structure will be used that has a group named SYS1 as the first group (root of the group tree). It will have four subgroups, GROUP1, GROUP2, GROUP3 and GROUP4. The first two of these (GROUP1 and GROUP2) will be owned by users while the last two (GROUP3 and GROUP4) will be owned by SYS1.

Further, GROUP2 has a subgroup (GROUP5) which it owns, GROUP3 has a subgroup (GROUP6) which it owns and GROUP4 has a subgroup (GROUP7) which is owned by USER3.

The first group in FIG. 2 is SYS1 and is the root of the group tree and thus assigned the SDK of 01. This represents the global or system wide cluster of 0 prefixed to the first base group SDK of 1.

GROUP1 and GROUP2 are owned by users, breaking the hierarchical structure, and therefore have SDK values at the base level, each being incremented by its occurrence, giving the SDK values of 02 and 03 respectively.

GROUP3 is the first occurrence of a group owned by its superior group and is thus given an SDK of 1 which is then prefixed by the SDK of its superior groups (SYS1) resulting in 011. Likewise, GROUP 4 is also owned by its superior group (SYS1) and is given the next SDK for its level, 2 and it is also prefixed with the SDK of its superior group resulting in 012.

GROUP5 is the 1st subgroup of GROUP2 and is owned by GROUP2. Therefore, it is given an SDK of 1 and prefixed with the SDK of GROUP2 resulting in an SDK of 031.

GROUP6 is a subgroup of GROUP3 and is owned by GROUP3. Since it is the first subgroup of GROUP3 it is given the SDK of 1 and prefixed with the SDK of GROUP3 resulting in a final SDK of 0111.

GROUP7 is a subgroup of GROUP4, but it is not owned by GROUP4. Thus, it represents a break in the hierarchy. It is assigned the next SDK value at the base level, resulting in an SDK of 04.

Figure 3:
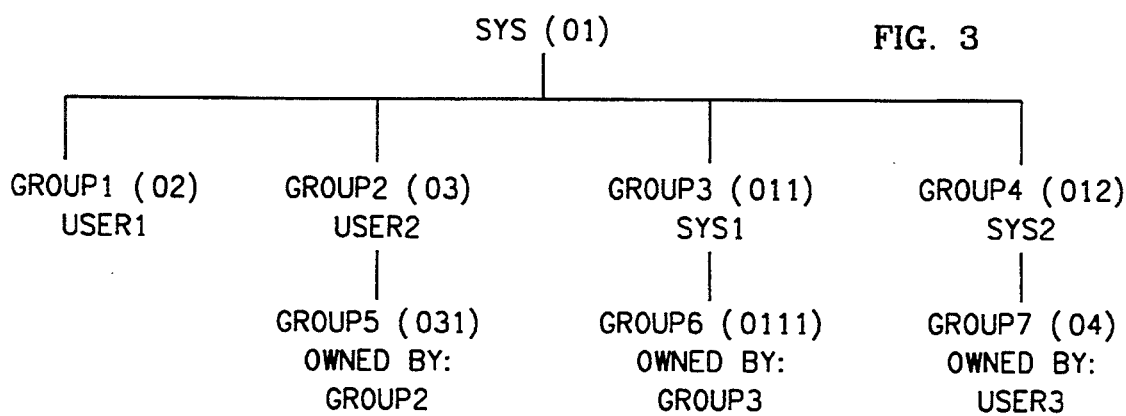
FIG. 3 is the structure of FIG. 2 with DOMKEYS added.

FIG. 3 shows the structure shown in FIG. 2 with the DOMKEYs assigned.

Assignment of DOMKEYs to Users

When a user is the SUBJECT (initiator) of an operation, SDKs are not used. This is because users, since they are not part of the hierarchy, do not receive an SDK or they receive a null SDK. When a user acts as the SUBJECT of an operation, ADKs are used instead of the SDKs. The ADKs represent the position within the hierarchy that a user appears at due to some attribute that they have been assigned. When a user is the OBJECT of an operation, ODKs are used.

Users may gain authorities to entities defined to the security system at two levels; at the System level and at the Group level. With RACF, this is accomplished by assigning the user one or more of SPECIAL, OPERATIONS or AUDITOR attributes.

An ADK is only given to a user if the user has at least one of these attributes assigned. If the attribute was assigned on a system-wide basis, then the user is assigned an ADK of 0. If the user was assigned the attribute on a group-wide basis, then an ADK is assigned that has a value equal to the SDK of the group level where the attribute was assigned.

Since the type of operations allowed varies according to the attributes that may be assigned to a user, it is necessary to maintain distinct ADKs for each attribute. Thus, a user may have an ADK for the SPECIAL attribute, and another for the OPERATIONS attribute. For ease of reference, ADKs for SPECIAL will be referred to as SADKs, for OPERATIONS, OADKs and for AUDITOR, AADKs.

Since a user may be connected to more than one group with these attributes, it is possible for a user to have multiple ADKs assigned to them; one for each group where the user has the attributes assigned.

In summary, for ADKs, a user may have all three types of ADKs (SADKs, OADKs and AADKs) assigned multiple times: one for each assignment of the particular attribute.

With regard to ODKs, each user has only one assigned. If the userid is owned by a group, then the ODK assigned to the user will have the same value as the ODK of the group that owns the user. If the user is not owned by a group, then the user will have a ODK with a value of 0, the system cluster value.

Assignment of DOMKEYs to Datasets and General Resources

All Datasets and General Resources must be owned by either a Group or a User. Since they are not capable of owning any other entity defined to RACF, they only get ODKs, and never get SDKs or ADKs. When owned by a group, datasets and general resources are always assigned an ODK with the same value as the SDK of the group that owns them. If the dataset or general resource is owned by a user, then it is assigned an ODK equal to the ODK of the user. This is due to the fact that if a group has authority over a user it also has authority over the resources owned by the user. If the owning User has an ODK of 0, then the Dataset or General Resource is assigned an ODK of 0.

Using the DOMKEYs in RACF

It is now possible to determine if a User has either system or group authority to access an OBJECT by comparing DOMKEYs. When the User attempts to access the OBJECT, each of the Users ADKs would be compared to the ODK of the OBJECT. If any of the comparisons match for the full length of the Users ADK over the OBJECT's ODK, the User has access to or authority over the OBJECT. If all of the comparisons fail, then the User is not authorized via system or group attributes to access the OBJECT, nor does the user have authority over the OBJECT.

Figure 4:
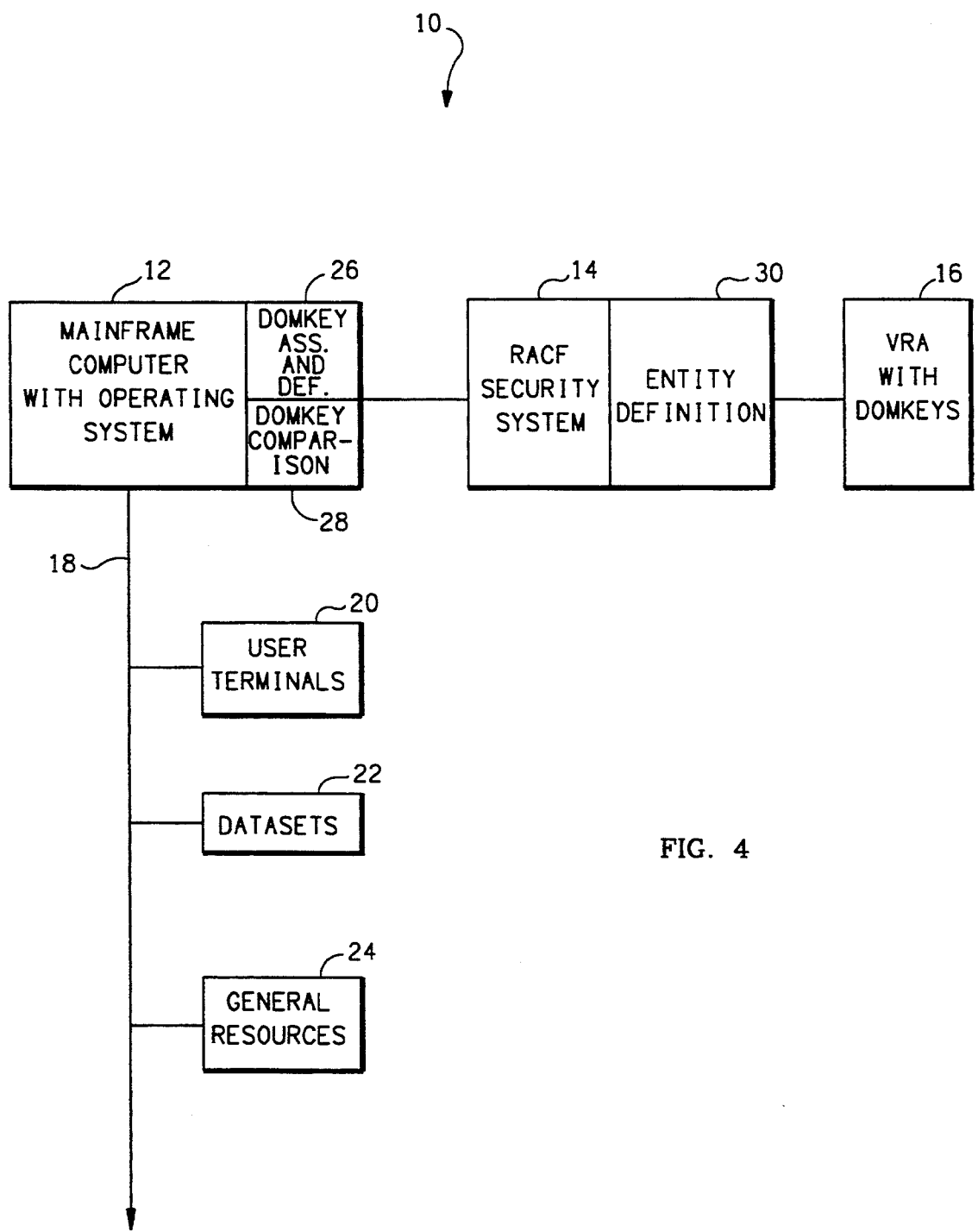
FIG. 4 is a block diagram of the main components in a computer security system employing the techniques of the present invention.

Referring now to FIG. 4, a block diagram of a computer system 10 employing the present invention is shown. In the preferred embodiment shown in FIG. 4, this system includes an IBM mainframe computer 12 running the MVS operating system. This computer 12 is loaded with the RACF security system 14. The DOMKEY assignment and definition 26, DOMKEY comparison 28 and entity definition 30 functions are also shown. In more detail, the DOMKEY assignment and definition function 26 defines a DOMKEY for each position in the hierarchy. The DOMKEY comparison function 28 compares the DOMKEYs of first and second entities along their full length to determine if the second the entity matches that of the DOMKEY for the first entity. The entity definition function 30 defines the relationships and hierarchical positions of the entities with respect to each other. A RACF administrator program 16 is used in conjunction with the RACF security system 14. In the preferred embodiment, the RACF administrator 16 comprises the VRA software product, version 1, release 5 sold by Vanguard Integrity Professionals of Orange, California. It will be appreciated that this RACF Administrator provides a number of features which extend the basic RACF functions to improve support for RACF security analysts and auditors. For example, the VRA 16 provides functions in three primary areas: 1) administrative support, including task oriented administration, authority analyzer, and information request services; 2) audit support functions including MVS system integrity monitoring, RACF protection analysis, authority analyzer, and information request services; and 3) data services including security information base creation, and DB2 Table Build Process. Further details of the VRA 16 may be found in the VRA user's guide and reference, version 1, release 5, available from Vanguard Integrity Professionals of Orange, Calif., which is hereby incorporated by reference.

In accordance with the teachings of the present invention, the VRA 16 has been modified to utilize DOMKEYs in a manner discussed previously. The mainframe 12 is connected along a system bus 18 to a variety of user terminals 20, datasets 22 and other general resources 24. In general, these entities 20, 22, 24 are the entities which exist in the system's hierarchy and will have DOMKEYs assigned to them.

Referring now to FIGS. 5a and 5b, a report generated in accordance with the present invention is shown. This report shows a hierarchical system in a manner which illustrates pictorially much like an organizational chart, which entities in a system have dominance over other entities. It will be appreciated that the generation of a report such as this would be a very time consuming task to perform with a RACF system alone. Further, even with a RACF administrator such as the VRA 16, the generation of such a report is a rather time consuming task. However, utilizing DOMKEYs in accordance with the present invention, a report such as that shown in FIGS. 5a and 5b can be generated relatively quickly. Further, by using DOMKEYS to determine a subject's position within the hierarchy, it is possible to provide distributed reporting and command capabilities. By incorporating DOMKEY processing within report generation logic, the report's content can be limited such that only SUBJECTS and OBJECTS that are within the scope of control of the subject requesting the report are included. This would be done by comparing the SDK's and ADK's of the requestor of the report to the ODK's of the SUBJECTS and OBJECTS being reported on. If any of the report requestor's DOMKEYS dominate the ODK of the OBJECT or SUBJECT being reported on then it is included in the report otherwise it is omitted. Similar capability is possible with regard to command generation. For a distributed environment, the process generating the commands can use the capabilities provided via DOMKEYS to limit the commands to those that only affect SUBJECTS and OBJECTS within the scope of control of the SUBJECT that will issue commands.

From the foregoing, it can be seen that the present invention provides a simple method of determining the relationship between entities in a hierarchy. When applied to a computer system, the present invention allows the determination of dominance relations without involving the security product each time the dominance relation is required. The invention permits decentralization to allow determination of dominance relations at a remote site without requiring access to the security product. The present invention operates quickly with a minimal amount of computing resources since the amount of information required to be stored to statically determine the relationship between entities is minimal. It is not only useful for determining the relationship between entities, but also for facilitating the production of reports or displays of hierarchical structures. It will also be appreciated that the teachings of the present invention may be applied to any system that uses a hierarchical structure for defining relations between defined entities. Those skilled in the art can appreciate that other advantages can be obtained from the use of this invention and that modification may be made without departing from the true spirit of the invention after studying the specification, drawings and following claims.

What is claimed:

1. A method for defining hierarchical relationships between functional entities in a hierarchy within a computer system, said hierarchy having a plurality of levels, each level having one or more positions, said method comprising the steps of:
    providing a computer system including functional entities having hierarchical relationships each of said functional entities corresponding to a position in said hierarchy;
    defining a DOMKEY for each position in said hierarchy, wherein each DOMKEY is a unique string of information, said step of defining further comprising the steps of:
        defining one or more logical positions within said DOMKEY; assigning data to each said logical position, said data being capable of representing the maximum number of entities which can be defined to a given level in said hierarchical structure; incorporating the DOMKEYs of higher positions in the hierarchy in their entirety into the DOMKEYs of positions below them in the hierarchy; and assigning a unique DOMKEY to each of the positions which are at the same level in the hierarchy;
    assigning each functional entity to said position in said hierarchy to which it corresponds;
    assigning to each functional entity in said hierarchy said defined DOMKEY which has been assigned to said position corresponding to said functional entity in said computer system's hierarchy; and
    for any selected first and second functional entities in said hierarchy where the second functional entity has a DOMKEY that is longer than that of the first entity, using said DOMKEYs to verify that the second functional entity is at a position below said first functional entity in said hierarchy by determining if the DOMKEY for the first functional entity is contained for its full length in the DOMKEY for the second functional entity.

2. The method of claim 1 wherein successive entities at the same level of the hierarchy are assigned incremental DOMKEYs.

3. The method of claim 2 wherein during the step of defining a DOMKEY
    DOMKEYs of the entities having dominance over other entities are incorporated by prefixing the DOMKEY of each said other entity with the entire DOMKEY of the entity having dominance over it.

4. The method of claim 1 wherein said step of defining a DOMKEY further comprises the steps of:
    defining one or more logical positions within said DOMKEY; and
    assigning data to each said logical position, said data being capable of representing the maximum number of entities which can be defined to a given level in said hierarchical structure.

5. The method of claim 1 wherein said relationships between entities in said hierarchy are such that entities at higher positions in said hierarchy have access to entities in positions below them in the hierarchy.

6. The method of claim 1 wherein said relationships between entities in said hierarchy are such that entities at higher position in said hierarchy have dominance over entities at positions below them in the hierarchy.

7. The method of claim 1 further comprising the steps of defining one of said DOMKEYs as a system DOMKEY, prefixing each DOMKEY with said system DOMKEY, and assigning the system DOMKEY to the highest position in said hierarchy.

8. The method of claim 1 wherein said hierarchy is a security system for said computer system, said entities represent user terminals for said computer system and said step of using said DOMKEYs to verify confirms that said second entity dominates said first entity.

9. The method of claim 1 further comprising the step of generating a report based on said determination which defines the position of each entity in said hierarchy.

10. A method for identifying the location of a functional entity in a hierarchy within a computer system said hierarchy having a plurality of levels, each level having one or more positions, said method comprising:
    providing a computer system including functional entities having hierarchical relationships, each of said functional entities corresponding to a position in said hierarchy;
    defining a DOMKEY for each position in said hierarchy wherein each DOMKEY is unique string of information said Step of defining further comprising the steps of:
defining one or more logical positions within said DOMKEY: assigning data to each said logical position, said data being capable of representing the maximum number of functional entities which can be defined to a given level in said. hierarchical structure: incorporating the DOMKEYs of higher positions in the hierarchy in their entirety into the DOMKEYs of positions below them in the hierarchy; and assigning a unique DOMKEY to each of the positions which are at the same level in the hierarchy:

assigning each functional entity to said position in said hierarchy to which it corresponds;

assigning to each functional entity in said hierarchy one of said DOMKEYs which has been assigned to said position corresponding to said functional entity in said computer system's hierarchy; and for any selected first and second functional entities in said hierarchy where the second functional entity has a DOMKEY that is longer than that of the first functional entity using said DOMKEYs to verify that the second functional entity is at a position below said first functional entity in said hierarchy by determining if the DOMKEY for the first functional entity is contained for its full length in the DOMKEY for the second functional entity.

11. A method for identifying if one functional entity in a hierarchy within a computer system has domination over a second functional entity in said hierarchy, said hierarchy having a plurality of levels, each level having one or more positions, said method comprising:

providing a computer system including functional entities having hierarchical relationships, each of said functional entities corresponding to a position in said hierarchy;

defining a DOMKEY for each position in said hierarchy wherein each DOMKEY is a unique string of information said step of defining further comprising the steps of:

defining one or more logical positions within said DOMKEY: assigning data to each said logical position, said data being capable of representing the maximum number of functional entities which can be defined to a given level in said hierarchical structure; incorporating the DOMKEYs of higher positions in the hierarchy in their entirety into the DOMKEYs of positions below them in the hierarchy; and assigning a unique DOMKEY to each of the positions which are at the same level in the hierarchy;

assigning each functional entity to said position in said hierarchy to which it correspond;

assigning to each functional entity in said hierarchy one of said DOMKEYs which has been assigned to said position corresponding to said functional entity in said computer system's hierarchy; and for any selected first and second functional entities in said hierarchy where the second functional entity has a DOMKEY that is longer than that of the first functional entity using said DOMKEYs to verify that the second functional entity is at a position below said first functional entity in said hierarchy by determining if the DOMKEY for the first functional entity is contained for its full length in the DOMKEY for the second functional entity, 12. A method for determining hierarchical relationships between functional entities in a hierarchy within a computer system, said hierarchy having a plurality of levels, each level having one or more positions, said method comprising:

providing a computer system including functional entities having hierarchical relationships, each of said functional entities corresponding to a position in said hierarchy;

defining a DOMKEY for each position in said hierarchy whereto each DOMKEY is a unique string of information said step of defining further comprising the steps of:

defining one or more logical positions within said DOMKEY: assigning data to each said logical position, said data being capable of representing the maximum number of functional entities which can be defined to a given level in said hierarchical structure: incorporating the DOMKEYs of higher positions in the hierarchy in their entirety into the DOMKEYs of positions below them in the hierarchy; and assigning a unique DOMKEY to each of the positions which are at the same level in the hierarchy;

assigning each functional entity to a position in said hierarchy to which it corresponds;

assigning to each functional entity in said hierarchy one of said DOMKEYs which has been assigned to said position corresponding to said functional entity in said computer system's hierarchy; and for any selected first and second functional entities in said hierarchy where the second functional entity has a DOMKEY that is longer than that of the first functional entity using said DOMKEYs to verify that the second functional entity is at a position below said said functional entity in said hierarchy by determining if the DOMKEY for the first functional entity is contained for its full length in the DOMKEY for the second functional entity.

13. A system for defining relationships between entities in a hierarchy, said hierarchy having a plurality of levels, each level having one or more positions, said system comprising:

means for defining a DOMKEY for each position in said hierarchy, wherein each DOMKEY is a unique suing of information, and wherein the DOMKEYs of higher positions in the hierarchy are incorporated in their entirety into the DOMKEYs of positions below them in the hierarchy said means for defining further comprising;

means for defining one more logical positions within said DOMKEY;

means for assigning data to each said logical position, said data being capable of representing the maximum number of entities which can be defined to a given level in said hierarchical structure: and means for assigning a unique DOMKEY to each position which is at the same level in the hierarchy;

means for assigning each entity to one of said positions in said hierarchy;

means for assigning to each entity in said hierarchy one of said DOMKEYs which corresponds to the position of said entity in said hierarchy; and means for comparing the DOMKEY for a first entity to determine if it matches for its full length with that of the DOMKEY for a second entity, whereby if said determination results in a match, it is confirmed that the second entity is at a position below said first entity in said hierarchy when said second entity has a DOMKEY that is longer than that of first entity.

14. The system of claim 13 wherein said means for defining a DOMKEY prefixes the DOMKEY of each entity with the entire DOMKEY of any entity having dominance over it.

15. The system of claim 13 wherein said means for defining a DOMKEY further comprises:
   means for defining one or more logical positions within said DOMKEY; and
   means for assigning data to each said logical position, said data being capable of representing the maximum number of entities which can be defined to a given level in said hierarchical structure.

16. The system of claim 13 wherein said hierarchy is a security system for a computer.

17. The system of claim 13 further comprising means for generating a report based on said matches which defines the position of each entity in said hierarchy.

18. The system of claim 17 wherein said means for generating a report further comprises means for limiting the report to subjects and objects that are within a report requestor's scope of control.

19. The system of claim 13 further comprising means for command generation; and
   means for limiting the scope of control of a subject issuing commands by means of said means for command generation, to only those subjects and objects dominated by said subject.

* * * * *

UNITED STATES PATENT AND TRADEMARK OFFICE
CERTIFICATE OF CORRECTION

PATENT NO. : 5,349,663
DATED : September 20, 1994
INVENTOR(S) : Ronn H. Bailey

It is certified that error appears in the above-indentified patent and that said Letters Patent is hereby corrected as shown below:

```
Cover Sheet,    add  --Attorney, Agent or Firm - Harness,
                     Dickey & Pierce--.

Column 3,  Line 34    after "also" insert therefor --for--.

Column 4,  Line 48    after "access" insert therefor --/--.

Column 5,  Lines 1-2  after "structure" insert therefor --)--.

Column 6,  Line 17    change "groups's" to --group's--.

Column 8,  Line 46    change "GROUP 4" to --GROUP4--.

Column 9,  Line 40    change "a" to --an--.

Column 10, Line 16    delete "the".

Column 12, Line 60    after "is" insert therefor --a--.

Column 12, Line 61    change "Step" to --step--.

Column 12, Line 64    change ":" to --;--.

Column 12, Line 66    delete ".".

Column 12, Line 67    change ":" to --;--.

Column 13, Line 4     change ":" to --;--.
```

UNITED STATES PATENT AND TRADEMARK OFFICE
CERTIFICATE OF CORRECTION

PATENT NO.  : 5,349,663
DATED       : September 20, 1994
INVENTOR(S) : Ronn H. Bailey It is certified that error appears in the above-indentified patent and that said Letters Patent is hereby corrected as shown below:

Column 13, Line 35   change ":" to --;--.

Column 13, Line 59   change "," to --.--.

Column 14, Line 2    change "whereto" to --wherein--.

Column 14, Line 6    change ":" to --;--.

Column 14, Line 10   change ":" --;--.

Column 14, Line 16   change "a" to --said--.

Column 14, Line 22   change "said" to --first--.

UNITED STATES PATENT AND TRADEMARK OFFICE
CERTIFICATE OF CORRECTION

PATENT NO. : 5,349,663
DATED : September 20, 1994
INVENTOR(S) : Ronn H. Bailey

It is certified that error appears in the above-indentified patent and that said Letters Patent is hereby corrected as shown below:

Column 14, Line 38    change "suing" to --string--.

Column 14, Line 42    change ";" to --:--.

Column 14, Line 43    after "one" insert therefor --or--.

Column 14, Line 49    change ":" to --;--.

Column 14, Line 49    begin new paragraph with "means"

Signed and Sealed this

Thirteenth Day of June, 1995

BRUCE LEHMAN

*Attest:*

*Attesting Officer*            Commissioner of Patents and Trademarks